Figure 2:
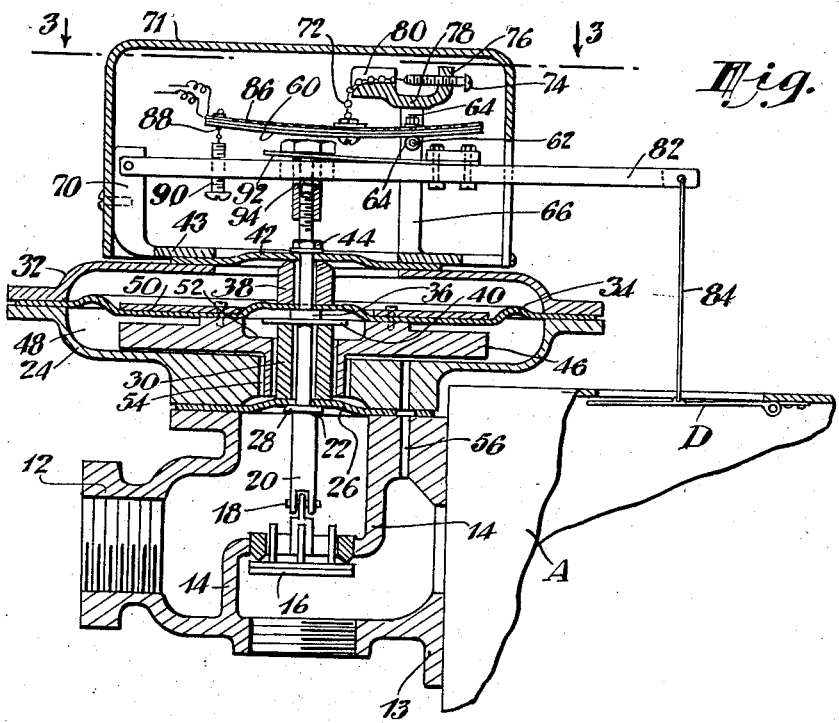

July 14, 1931.                 A. L. KLEES ET AL                 1,814,834
                       FLUID FLOW REGULATING APPARATUS
                       Filed June 14, 1930        2 Sheets-Sheet 1

Inventors
ALBERT L. KLEES
BENJAMIN GREENFIELD
By their Attorney
Edmund G. Borden July 14, 1931.  A. L. KLEES ET AL  1,814,834
FLUID FLOW REGULATING APPARATUS
Filed June 14, 1930   2 Sheets-Sheet 2

Inventors
ALBERT L. KLEES
BENJAMIN GREENFIELD
By their Attorney

Patented July 14, 1931

1,814,834

UNITED STATES PATENT OFFICE

ALBERT L. KLEES, OF LONG BEACH, AND BENJAMIN GREENFIELD, OF JACKSON HEIGHTS, NEW YORK, ASSIGNORS TO SURFACE COMBUSTION CORPORATION, OF TOLEDO, OHIO, A CORPORATION OF NEW YORK

FLUID FLOW REGULATING APPARATUS

Application filed June 14, 1930. Serial No. 461,113.

The present invention relates to fluid flow regulating mechanism and it has special utility in connection with combined gas pressure regulators and cut-off valves for use with gas-burning appliances such as are used with domestic house-heating furnaces.

It is common practice in the control of gas-burning equipment of the type indicated, as to the shutting off of the flow of gas to the burner, to employ a room thermostat in a circuit with a motor mechanism adapted to actuate a gas cut-off valve and having no connection with the pressure regulator normally required in such installations. The type of motor mechanism commonly used for the purpose is relatively expensive, and of course is not adapted for regulating the pressure of the gas flowing to the burner. It becomes necessary therefore to provide a gas pressure regulator as a separate piece of equipment, which materially increases the amount of space occupied by the essential elements of the burner assembly and introduces an added item of expense.

Combined fluid pressure- and flow-regulators comprising automatic cut-off mechanism are now known for service in gas heating installations for automatically opening the gas line to a burner when there is a demand for heat at some selected point remote from the burner, for cutting off the flow of gas thereto when the demand for heat ceases, and for maintaining a uniform fluid pressure in the line to the burner during such flow. Apparatus of this general type forms the subject-matter of our copending U. S. application #424,153 filed January 29th, 1930, of which this application is a continuation-in-part.

The present invention embodies certain improvements over the construction shown in our aforementioned co-pending application whereby the operation of both the low pressure regulator and the automatic cut-off valve mechanism is substantially facilitated and the sensitiveness of the cut-off valve-operating mechanism for permitting the valve to function upon demands for heat from a room thermostat is greatly increased.

Among the more important objects of the invention are to provide in an automatic cut-off valve mechanism operated by a heat-controlled snap-action element, for improving the time-operating characteristics of the valve; to provide in apparatus of the character described for applying in an improved manner the forces developed in a bimetallic snap-action element for effecting a positive operation of the cut-off valve mechanism, and a secondary air damper; to provide in an improved manner for facilitating the ventilation of a snap-action disc and the associated heating element employed in an automatic cut-off mechanism, of the type described and to provide in such mechanism for so controlling the forces developed by a thermally-controlled snap-action mechanism as to make possible the close coupling with the burner duct of the valve controlled by such mechanism whereby it is possible to employ a very short secondary air damper-operating lever.

Figure 1:
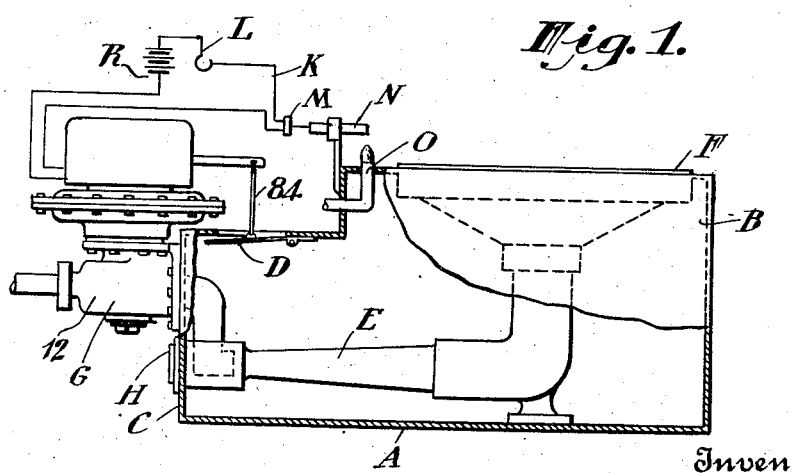
Figure 3:
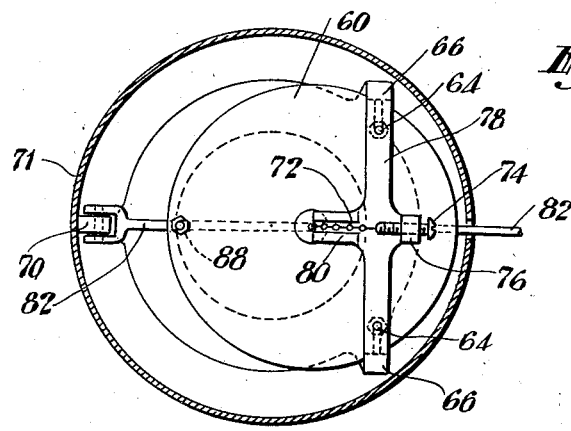
Figure 4:
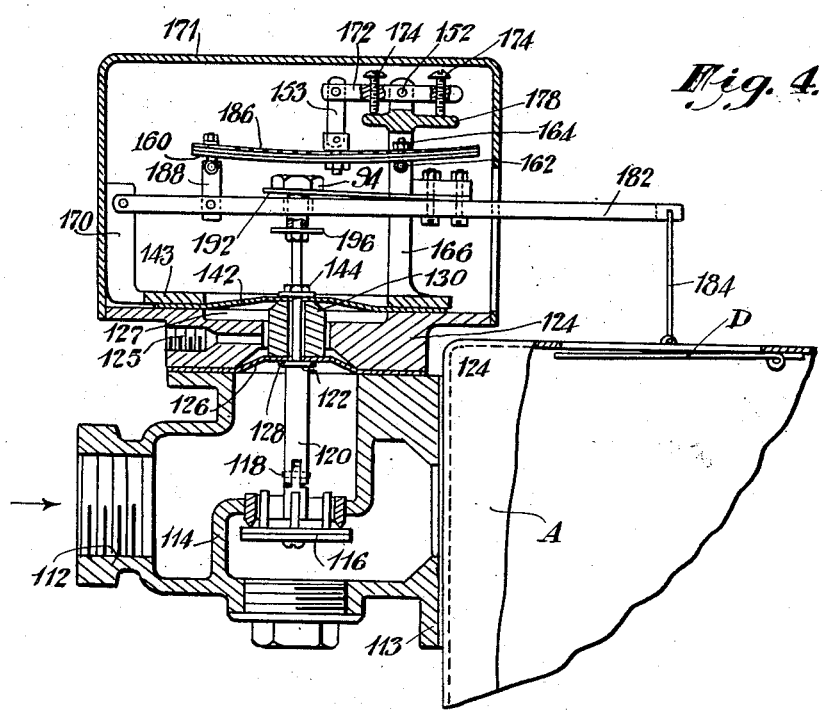

Referring to the accompanying drawings wherein are illustrated certain embodiments of the invention, Fig. 1 is a somewhat diagrammatic showing of a gas burning appliance, illustrating an adaptation to the same of the present invention; Fig. 2 is a vertical section of a combined pressure regulator and cut-off valve embodying one form of the invention; Fig. 3 is a horizontal view taken along the line 3—3 of Fig. 2 looking in the direction of the arrows; parts being omitted; and Fig. 4 is a vertical section through an automatic cut-off valve illustrating another modification of the invention.

Referring to Fig. 1 of the drawings, a gas-burning appliance is shown, the same comprising an elongated burning-housing A having an offset portion B, a front closure C, and a hinged damper D. A mixing tube E conducts to a burner F a combustible mixture of gas and air flowing from the gas valve G forming the subject matter of the present invention. Primary air enters the tube E through a shutter-controlled opening H in the closure member C; secondary air enters the housing A through the damper D and thence flows to the burner F. As indicated, the damper D is operatively associated with the valve G in such manner that when the latter is open to permit flow of gas to the burner F, the damper D will be open to allow secondary air to flow to the burner, and vice versa. The off-set portion B carrying the burner is adapted to be positioned within a furnace.

An electric circuit K having therein a room thermostat L, is adapted to be interrupted by a switch M controlled by a thermal element N, the latter being adapted to be heated by a pilot burner O. The arrangement of these parts is such that the switch M will be maintained in closed position only when the pilot burner is lighted. The circuit K is normally closed when there is a call for heat at the room thermostat, and functions to actuate valve-operating mechanism within the gas valve G—such mechanism comprising a heat motor. A thermal element associated with the heat motor is in the circuit K and is adapted to actuate the heat motor upon being heated by an electric current from a battery or the like R, in a manner to prevent closing of the valve G, during the time that circuit K is closed.

Referring to the embodiment of the invention shown in Figs. 2 and 3, there is provided a valve casing 12 having therein a fluid passageway and being divided by a partition 14 into an inlet portion and an outlet portion, the latter being substantially shorter than the other and being flanged as at 13 whereby the valve may be close coupled to the burner housing A. Formed in the partition 14 is a port opening adapted to be closed by a valve 16, flexibly connected as at 18 to a valve stem 20, the latter having formed thereon a shoulder 22. The upper portion of the stem 20 is threaded for a purpose to be described. A bowl-shaped housing member 24 is mounted on casing 12, these members having secured between them by bolts or the like a flexible sealing and balancing diaphragm 26 of leather or the like. The diaphragm 26 is also secured to the valve stem 20 between a washer 28 held adjacent to the shoulder 22 and a collar 30 loosely surrounding the valve stem.

A flanged housing member 32 having a central aperature is mounted upon the bowl-shaped member 24; and a flexible pressure-regulating diaphragm 34 is interposed between the housing members 24 and 32, and has its outer margin secured between the said members. Diaphragm 34 is also secured to the valve stem 20 between collars 30 and 38, a washer 40 and a collar 36 being shown as inserted between the collar 30 and the diaphragm. A flexible sealing diaphragm 42 is secured between housing member 32 and an annular supporting member 43, this diaphragm also being secured to the stem 20 between the collar 38 and a threaded adjusting-nut 44. The tightening of the respective diaphragms 26, 34 and 42 upon the valve stem 20 is accomplished simultaneously by means of the adjusting nut 44.

A floating weight 46 is positioned within a chamber 48 between the housing member 24 and the diaphragm 34, and is secured to the latter by bolts or the like passing through the same and through an upper retaining ring 50. The weight 46 has a counter-sunk shoulder 52 adapted to engage with the washer 40 when the weight is raised under the action of the diaphragm 34. A depending guide boss 54 on the weight moves freely in the space between the collar 30 and housing member 24. A passageway 56 connects the outlet end of the valve casing 12 with the chamber 48. An outlet line (not shown) may be provided in housing 32 for conducting away gases accidentally leaking past the diaphragm 34 from below.

To provide for the automatic operation of the valve 16 by means of a heat motor and independently of the pressure-regulating mechanism, there is provided a novel arrangement of a heat motor and a compound leverage system, the same including a disc 60 adapted when cold to assume a convexo-concave form with the convex surface facing downwardly, and adapted when hot to reverse such curvature, the said change in curvature being accompanied with a sudden snap action on either side of a dead center position of the disc. The disc is supported at one side of its center on a horizontally disposed axis or pin 62 by means of eyebolts 64 through the eyes of which the pin extends, the pin being supported by posts 66 rising from the annular member 43. The tops of the posts are bridged by a cross piece 78 provided with an upright lug 76 for supporting an adjusting screw 74. A bead chain 72 is coupled to the center of the disc 60 and to the screw 74 the chain resting on a saddle 80 projecting from the cross piece 78. Flexibly connected to the disc as at 88 is an adjusting screw 90 supported by a lever 82 pivoted on a post 70 rising from said annular member 43, said lever serving among other things to operate the damper D to which it is connected by a link 84.

Secured in suitable manner to the upper side of the bimetallic disc is an electric heating element 86, the lead wires to which are in the circuit K containing the room thermostat. The lever 82 carries a flat spring 92 having an aperture near one end through which a sleeve nut 94 extends, the latter also passing freely through a corresponding aperture in the lever 82. The nut 94 is connected to the valve stem 20, to permit vertical adjustment of the latter with respect to the lever 82 and spring 92.

The arrangement of the valve and valve-operating mechanism is such that when the lever 82 is in lowermost position, the valve 16 is off its seat, due to its own weight and the weight of the associated parts of the leverage system,—while the functioning of the device as a pressure regulator is not interfered with. When the valve 16 is closed by the upward movement of the lever 82 due to a force transmitted thereto from the disc 60 through the connection 88, gas pressure will no longer be effective in the chamber below diaphragm 34, and hence the weight 46 will drop and remain in contact with the bottom of the chamber 48 until the valve is released by the said lever, whereupon the apparatus may again function as a pressure-regulator. In adjusting the valve-operating mechanism, the lever 82 is first adjusted by means of sleeve nut 94 while the valve disc 16 is at its seat and the flat spring 92 is suitably but not fully compressed. The relative position of the lever 82 for adjusting the air damper D with respect thereto is then effected by means of adjusting screw 90,—following which the desired degree of tension is placed on the entire compound-lever assembly, including the disc 60, by means of adjusting screw 74. When the valve disc 16 is at its seat and bimetallic 60 is cold, the spring 92 is compressed, preferably until almost in metal to metal contact with the lever 82.

A cover member 71 is provided for the supporting member 43 and the various parts carried thereby, the same being provided with a slot through which a portion of the lever 82 freely extends.

Fig. 4 illustrates a modification of the invention in which an independent automatic cut-off valve and valve-operating mechanism is employed, for utilization where it is not desired to incorporate in a unitary structure such a mechanism together with a low pressure regulator mechanism. In Fig. 4, the construction of the parts located within the valve casing 112 is similar to the corresponding parts within the housing 12 of Fig. 2, excepting that the valve outlet is not in communication with the chamber 127. In this modification, the flexible sealing-and-balancing diaphragm 126 is secured between the adjacent housing members 112 and 124, and is also secured to the valve stem 120 between a washer 128, adjacent a shouldered portion 122 of the valve stem, and a collar 130 through which the valve stem freely extends. A second sealing diaphragm 142 is secured between the housing member 124 and a supporting member 143 carried thereby. The sealing diaphragm 142 is also secured to the valve stem 120 between the collar 130 and an adjusting nut 144. The construction of the supporting member 143 and the various elements thereof 166, 166, 170 is like that of the corresponding parts shown in Fig. 2.

The mechanism for the operation of the valve with a snap-action includes a resilient bimetallic disc 160 secured at its center to a lever arm 172 through the intermediary of a link 153 pivotally connected to each. The member 172 is pivotally mounted upon a pin 152 carried in ears formed on a cross member 178 supported upon the posts 166, 166. A pair of adjusting screws 174, 174 are positioned on opposite sides of the pin 152 and are adapted to cooperate with the member 178 for adjusting the position of the lever member 172 with respect thereto, and for locking the same in such position. The bimetallic disc 160 is mounted, by means of a pair of eye-bolts or the like, 164, upon a rod or pin 162 in the same manner as the bimetallic disc 60 of Fig. 2. A margin of the bimetallic disc 160 opposite the pivot pins 162 is connected to the lever 182 by means including a link 188.

In this modification, in which the pressure-regulating feature has been eliminated, the force developed by the bimetallic disc may normally be employed not only to close the valve 116, but also to force the valve open with a positive action by forces developed in the said disc. It will be noted that rigid suspension members 153 and 172 have been substituted for the bead-chain suspension member 72 of Fig. 2; and that a rigid link member 188 has been substituted for the bead-chain suspension member 88 of Fig. 2. A washer 196 is adjustably secured on the valve stem 120 in contact with the adjusting nut 94, and is adapted to be engaged by lever 182 upon the downward movement of the latter as soon as the required tension has been released in the release spring 192 on the valve-opening stroke whereby to force the valve 116 from its seat in case it should be stuck thereto. Any gas escaping past the diaphragm 126 into the chamber 127 located immediately below the diaphragm 142 is removable through conduit 125, the latter of which may lead to a burner or other suitable point of discharge.

In adjusting the valve mechanism of Fig. 4,—screws 174 are adjusted until rocker arm 172 is in such position that the valve 116 is securely seated when the bimetallic element 160 is cold,—the release spring 192 being in almost metal to metal contact with the lever 182, and the damper D being closed. A cover member 171 is provided for protecting the adjustable parts of the valve operating mechanism.

If desired, the cut-off valve operating mechanism of Fig. 4 or its equivalent may be employed in connection with a combination low pressure regulator and cut-off valve of the type shown in Figs. 2 and 3; and the valve-operating mechanism of Fig. 4 may be employed with the combination valve of Figs. 2 and 3.

The operation of the automatic cut-off valve mechanism will be clear from the following description. With no demand for heat, the normal position of the bimetallic disc is with the convex side facing downward, the parts being so adjusted that, in this position of the disc, the cut-off valve and the secondary air damper are both closed. Upon a call for heat from the room thermostat, the heating of the bimetallic disc by its heating element results with consequent sudden change in curvature of the disc whereby the marginal portions of the latter are lowered a substantial distance with consequent dropping of the lever arm 82 together with the valve stem and the damper-controlling member associated therewith. The spring member associated with the lever arm and valve stem functions to prevent any slight opening of the valve during the initial slow downward movement of the marginal portions of the snap-action disc during the heating thereof prior to the time when dead-center has been passed and forces have been developed in the bimetallic disc effective for suddenly opening the valve. When the demand for heat ceases, heat is rapidly lost from the bimetallic largely by radiation and convection whereupon the bimetallic disc resumes its original curvature with consequent sudden closing of the cut-off valve. During the time the valve is closed by the functioning of the heat motor, the pressure-regulating element cannot function, and the floating weight in the pressure-regulating chamber rests upon the housing member immediately below it.

The area of the sealing diaphragm,—such as diaphragm 26 of Fig. 2,—is preferably so selected that the pressure exerted upwardly thereon by the gas just balances the pressure exerted by the gas downwardly upon the valve 16. Vertical adjustment of the valve stem with respect to the lever arm 82 can be made by means of the sleeve nut 94, independently of the adjustment of the damper D with respect to the said lever.

The compound leverage system employed makes possible a neat compact apparatus design for the purpose indicated, which occupies but a small space while at the same time being efficient in operation. Economy of operation has been facilitated by maintaining close contact of the bimetallic disc and the associated flat heating coil employed; by keeping the mass of material to be heated and the amount of heat-radiating surface as low as possible; and by polishing or plating radiating surfaces so as to minimize heat radiation.

Apparatus constructed in accordance with the present invention has many substantial advantages over the equipment heretofore employed for similar purposes, such as the desirable commercial advantages of requiring fewer parts, which are extremely easy to assemble and adjust. The use of a compound leverage system, one member of which is a bimetallic element employed for developing the energy required for operating the valve mechanism, has made it possible to produce a highly efficient valve assembly of very neat appearance, light in weight, and one which is adapted to function quickly upon calls for heat by a room thermostat. It has also been possible to directly connect the secondary air damper to a member of the compound leverage system, thereby more closely coupling the valve body and the burner duct assembly so as better to utilize the forces developed in the heat motor for operating the damper. The supporting member which carries the compound leverage system and the associated parts preferably is no larger in diameter or length than the diameter of the low pressure regulator chamber, when such regulator is part of the assembly. The bead chain linkages employed contribute very substantially to the development of a relatively inexpensive, highly efficient valve while avoiding the necessity for close machine work and the accurate alignment and fitting of parts.

It will be understood from the foregoing that valves embodying the present invention may be employed as combination low pressure gas-regulators and automatic shut-off valves, or they may be constructed in a manner somewhat as shown in Fig. 4, to function as automatic cut-off valves only. The service of the apparatus for operating a secondary air damper is optional; and other means for such damper control may be provided. Suitable mechanism may be provided such for example as that shown in our aforementioned co-pending application for manually operating the cut-off valve mechanism in case of the failure of electric power.

The invention is susceptible of modification within the scope of the appended claims.

We claim:

1. In a controlling system for burners, the combination with a valve and valve seat in a supply line through which fuel is supplied to the burner, of automatic valve-operating mechanism operatively associated with the said valve, this mechanism comprising a bimetallic member having respective concave and convex surfaces and adapted when energized to reverse its curvature with an instantaneous snap action, a support on which said member is fulcrumed, means for adjusting the said bimetallic member about its fulcrum, means connecting said valve and member, and means for energizing said member.

2. In a controlling system for burners, the combination with a valve casing having a valve and a valve seat, and disposed in a supply line from which fuel is supplied to the burner, of an automatic valve operating mechanism associated with the said valve and comprising as an element thereof a combined leverage system including a pivotally-mounted bimetallic member having respective concave and convex surfaces and adapted when energized to reverse the curvature of the said surfaces with an instantaneous snap action, and heating means associated with the said member and with a thermostat for thus energizing the former.

3. In a compact unitary structure, the combination of a valve casing having a valve seat, a valve in said casing balanced against inlet fluid pressure and having a valve stem, a support and housing for the valve stem, sealing means associated with the said valve stem and housing for permitting substantially frictionless relative movement of the stem and housing, means connecting the valve stem with the said support including an adjustable, bimetallic element carried upon the said support, and a pivoted lever member operatively connected with a marginal portion of the bimetallic element and with the valve stem.

4. In a compact unitary structure, the combination of a valve casing having a valve seat, a valve in said casing balanced against inlet fluid pressure and having a valve stem, a housing for the said stem, means for supporting the valve and valve stem and for seating the valve, this last-mentioned means comprising a bimetallic thermally-controlled resilient element carried by the said housing and adjustable for both pivotal movement about a horizontal axis and for movement toward and away from the valve seat, and means for heating the said bimetallic element.

5. In a combined pressure regulator and cut-off mechanism associated with a burner assembly including a secondary air damper, the combination with a diaphragm and its chamber and a valve casing having a valve seat and provided with a passage extending from the delivery side of said casing to said diaphragm chamber and a valve in said casing normally movable with said diaphragm to permit the latter to regulate the pressure at the delivery side of the casing, a pivoted resilient bimetallic element operatively associated with the said valve and with the secondary air damper for actuating in a positive manner the same in each of two directions, and stop members associated with the valve stem for initiating movement of the latter in either direction under the influence of motion transmitted from the said bimetalic element.

6. A controlling system for burners comprising the combination with a valve in a supply line through which fuel is supplied to a burner provided with a secondary air damper and a flexible diaphragm continuously subjected to fluid pressure at the delivery end of said valve for closing the latter when the fuel pressure at the delivery end of the valve exceeds a given value, of a heat motor operatively associated with the said valve through means including a yielding member, the said heat motor comprising a curved, resilient bimetallic member supported at a midportion thereof by a flexible non-kinking member and so disposed as to form one element of a compound leverage system, another element of which is directly connected with both the valve and the said secondary air damper, and means including a second flexible member connecting a marginal portion of the bimetallic diaphragm with another element of the compound leverage system.

7. In a combined pressure regulator and cut-off mechanism of the character described, the combination of a valve casing having inlet and outlet ends, a valve and valve stem associated therewith, a regulating diaphragm connected to the said valve stem and defining a chamber in communication with the outlet end of the said casing, means for operating the valve independently of the said diaphragm, the last-named means comprising a compound leverage system which includes a resilient, bimetallic member having respective concave and convex surfaces and adapted when energized to reverse the curvature of the said surfaces with an instantaneous snap action, means for freely supporting the said bimetallic member at a mid-portion thereof, and means associating a marginal portion of the said member with the valve stem.

8. Apparatus as defined in claim 7 including means for operatively associating the bimetallic member with a secondary air damper in a burner housing adjacent the valve casing.

9. In a combined pressure regulator and cut-off mechanism of the character described, the combination of a valve casing having inlet and outlet ends, a valve and a valve stem associated therewith, a regulating diaphragm connected to the said valve stem and defining a chamber in communication with the outlet end of the said casing, means for operating the valve independently of the said diaphragm, the last-named means comprising a resilient bimetallic member supported by mechanism including a flexible element adapted to limit heat conduction from the bimetallic member, and means comprising a second flexible element of low heat-conductivity connecting the marginal portion of the bimetallic member to the valve stem.

10. In a combined pressure regulator and cut-off mechanism of the character described, the combination of a valve casing having inlet and outlet ends, a valve and valve stem associated therewith, a regulating diaphragm connected to the said valve stem, and defining a chamber in communication with the outlet end of the said casing, means for operating the valve independently of the said diaphragm, the last-named means comprising a resilient bimetallic member supported by a flexible non-kinking element of low heat conducting capacity, means for operatively associating the bimetallic member with the valve stem, the bimetallic member having respective concave and convex surfaces and adapted when energized to reverse the curvature of the said surfaces with an instantaneous snap action, heating means associated with the said member for thus energizing it, and means for varying the amount of energy required for thus energizing the bimetallic member by said heating means.

11. In a combined pressure regulator and cut-off valve mechanism of the character described, the combination of a valve casing having inlet and outlet ends, a valve and valve stem associated therewith, a pressure-regulating diaphragm connected with the said valve stem and in communication with the outlet end of the casing, means independent of the diaphragm for supporting the valve and valve stem within the valve casing, such last-named means comprising a compound leverage system, one member of which is an adjustably suspended, resilient heat motor.

12. In a combined pressure regulator and cut-off mechanism of the character described, the combination of a valve casing having inlet and outlet ends, a valve and valve stem associated therewith, a pressure-regulating diaphragm in communication with the outlet end of the said casing and associated with the said valve stem, means for operating the valve independently of the said diaphragm, the last-named means comprising a compound system of levers which includes an adjustable, resilient heat motor and a yielding holdback mechanism operatively associated with the said valve, the said motor being adapted when actuated to open or close the valve with an instantaneous snap action to quickly cut off the flow of fluid through the casing, and means for so actuating the motor element.

In testimony whereof I affix my signature.
ALBERT L. KLEES.
In testimony whereof I affix my signature.
BENJAMIN GREENFIELD